US009605378B2

(12) United States Patent
Asami et al.

(10) Patent No.: US 9,605,378 B2
(45) Date of Patent: Mar. 28, 2017

(54) TEXTILE PRINTING METHOD, INKJET INK FOR TEXTILE PRINTING, AND ELECTROPHOTOGRAPHIC TONER FOR TEXTILE PRINTING

(71) Applicants: Tsuyoshi Asami, Kanagawa (JP); Tsuneo Kurotori, Tokyo (JP); Takeo Yamaguchi, Kanagawa (JP); Noriaki Okada, Kanagawa (JP)

(72) Inventors: Tsuyoshi Asami, Kanagawa (JP); Tsuneo Kurotori, Tokyo (JP); Takeo Yamaguchi, Kanagawa (JP); Noriaki Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 14/556,693

(22) Filed: Dec. 1, 2014

(65) Prior Publication Data

US 2015/0152591 A1 Jun. 4, 2015

(30) Foreign Application Priority Data

Dec. 3, 2013 (JP) ................................. 2013-250227
Aug. 26, 2014 (JP) ................................. 2014-171520

(51) Int. Cl.
*C09B 62/01* (2006.01)
*D06P 1/04* (2006.01)
(Continued)

(52) U.S. Cl.
CPC ................ *D06P 1/04* (2013.01); *D06P 5/006* (2013.01); *D06P 5/30* (2013.01); *G03G 7/0093* (2013.01); *G03G 9/091* (2013.01)

(58) Field of Classification Search
CPC ...... G03G 7/0093; G03G 9/091; D06P 5/006; D06P 5/30; D06P 1/04
(Continued)

(56) References Cited

U.S. PATENT DOCUMENTS 4,985,733 A 1/1991 Kurotori et al.
4,987,457 A 1/1991 Mochizuki et al.
(Continued)

FOREIGN PATENT DOCUMENTS

EP 0152765 * 1/1985
JP 56-134286 10/1981
(Continued)

OTHER PUBLICATIONS

STIC Search Report dated Mar. 22, 2016.*
English translation (Mar. 24, 2016) of the EP 0152765.*

*Primary Examiner* — Eisa Elhilo
(74) *Attorney, Agent, or Firm* — Oblon, McClelland, Maier & Neustadt, L.L.P.

(57) ABSTRACT

A textile printing method that includes printing to a textile with a material including a dye expressed by the following general formula 1.

<General formula 1>

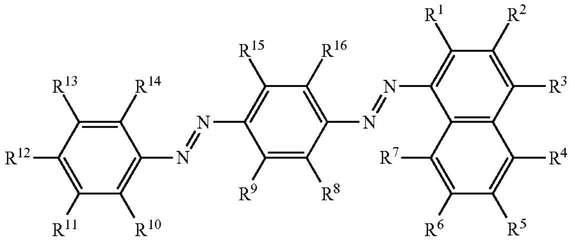

In general formula 1, $R^1$ to $R^{16}$ is H, $CH_3$, OH, $NHC_2H_5$, COOH, $SO_3H$, $SO_3Na$, $NO_2$, or $NH_2$.

9 Claims, 3 Drawing Sheets

(51) Int. Cl.

| | |
|---|---|
| ***D06P 5/30*** | (2006.01) |
| ***D06P 5/28*** | (2006.01) |
| ***G03G 7/00*** | (2006.01) |
| ***G03G 9/09*** | (2006.01) |

(58) Field of Classification Search

USPC .............................................................. 8/543

See application file for complete search history.

(56) References Cited

U.S. PATENT DOCUMENTS

| | | | | |
|---|---|---|---|---|
| 5,099,289 | A | 3/1992 | Kurotori et al. | |
| 5,155,534 | A | 10/1992 | Kurotori et al. | |
| 5,402,220 | A | 3/1995 | Tanaka et al. | |
| 5,534,379 | A * | 7/1996 | Dalal | G03G 9/0802 430/108.23 |
| 5,809,388 | A | 9/1998 | Inada et al. | |
| 2004/0131402 | A1 | 7/2004 | Kurotori et al. | |
| 2005/0254867 | A1 | 11/2005 | Kurotori et al. | |
| 2006/0115762 | A1 | 6/2006 | Katano et al. | |
| 2006/0263712 | A1 | 11/2006 | Katano et al. | |
| 2007/0147913 | A1 | 6/2007 | Katano et al. | |
| 2007/0243483 | A1 | 10/2007 | Katano et al. | |
| 2008/0063446 | A1 | 3/2008 | Katano et al. | |
| 2008/0069612 | A1 | 3/2008 | Nakamura et al. | |
| 2008/0213002 | A1 | 9/2008 | Katano et al. | |
| 2009/0003903 | A1 | 1/2009 | Katano et al. | |
| 2009/0067904 | A1 | 3/2009 | Katano et al. | |
| 2009/0081571 | A1 | 3/2009 | Katano et al. | |
| 2009/0245896 | A1 | 10/2009 | Ishikake et al. | |
| 2011/0002718 | A1 | 1/2011 | Katano et al. | |
| 2011/0013957 | A1 | 1/2011 | Katano et al. | |
| 2011/0217098 | A1 | 9/2011 | Tomono et al. | |
| 2011/0229231 | A1 | 9/2011 | Kaneko et al. | |
| 2011/0268480 | A1 | 11/2011 | Katano et al. | |
| 2012/0135342 | A1 | 5/2012 | Katano et al. | |

FOREIGN PATENT DOCUMENTS

| | | |
|---|---|---|
| JP | 3-152282 | 6/1991 |
| JP | 7-138888 | 5/1995 |
| JP | 7-278482 | 10/1995 |
| JP | 8-226083 | 9/1996 |
| JP | 10-195776 | 7/1998 |
| JP | 2002-251039 | 9/2002 |
| JP | 2003-055884 | 2/2003 |
| JP | 2003-096340 | 4/2003 |
| JP | 2005-029900 | 2/2005 |
| JP | 2007-248853 | 9/2007 |
| JP | 2012-251062 | 12/2012 |

* cited by examiner

TEXTILE PRINTING METHOD, INKJET INK FOR TEXTILE PRINTING, AND ELECTROPHOTOGRAPHIC TONER FOR TEXTILE PRINTING

CROSS-REFERENCE TO RELATED APPLICATIONS

This patent application is based on and claims priority pursuant to 35 U.S.C. §119 from Japanese Patent Application No. 2013-250227, filed on Dec. 3, 2013, and 2014-171520, filed on Aug. 26, 2014, both in the Japan Patent Office, which is hereby incorporated by reference herein in its entirety.

BACKGROUND

Technical Field

Exemplary embodiments of the present disclosure generally relate to a textile printing method, an inkjet ink for use in textile printing, and an electrophotographic toner for use in textile printing.

Description of the Related Art

Screen printing methods, roller printing methods, rotary-screen printing methods, gravure printing methods, and transfer printing methods employing the aforementioned printing methods are well-known as methods to draw a durable and fine pattern on a textile with dyes, and are applied in industries. However, the above-described methods, which are plate-making methods, have a limitation with respect to the number of colors. In printing using color-separated frames of the three primary colors, multiple color impression can be expressed. However, adjusting hue and concentration of dyes used to form the three primary colors is difficult. In a print process, the three primary colors are superimposed on each other. Accordingly, there is an issue of reproducibility of the print. In addition, there is a need to make a screen frame or an engraving roller for each change of a drawing pattern. In a small lot production, cost of making engraving becomes high. In a printing process, in addition to required amount of processing with respect to change of the drawing pattern in the printing process, there is a need to prepare surplus color paste. This increases material loss. To overcome the above-described issues, methods of direct printing to a fiber material (i.e., textile) are in practice. The direct printing reads an image of a pattern to be printed with a scanner, generates an image signal by a computer, and directly prints the image on a fiber material using an electrophotographic or inkjet method. In another example, a method of printing an image to a transfer sheet and transferring the printed image to the fiber material is in use.

In recent years, a textile printing method has been proposed, in which conventional engraving plate-making processes are omitted such that a time required for manufacturing is reduced. However, in this textile printing method, there is a need to employ ink including dyes appropriate for a textile type. Accordingly, many ink types are necessary. In a case of printing small lots of various prints with respect to various textile types, costs in ink tend to increase. In methods of direct printing to various textile types, unlike printing with respect to a paper, sharpness of the image significantly deteriorates due to bleeding of ink generated by capillary phenomenon of the fiber material. Capillary phenomenon is generated according to thickness of fibers, surface roughness, nap, concentration, or the like that is distinctive to the fiber material making texture and touch of the fiber material good. To overcome the bleeding of ink, there are various proposals for pre-processing with respect to the fiber material. However, there are issues such as reproducing texture distinctive to the fiber material that is lost due to the pre-processing, and fixation and solidification of dye printed to the fiber material. Particularly, in a case of inkjet printing of small dots of a dye liquid to a transfer sheet, it is pointed out that there is a lack of uniform affixation of the small dots to the fiber material from the transfer sheet, and a loss of fineness of the small dots on the fiber material due to bleeding of the dye liquid.

To overcome the lack of uniform affixation and the loss of fineness due to bleeding of the dye liquid, a method of employing a release agent coated sheet, serving as the transfer sheet, coated with a water soluble adhesive paste and then inkjet printing is proposed. However, the above-described proposed method is insufficient with regards to obtaining fineness of the drawing pattern. In a case of a dry transfer employing the above-described release agent coated sheet with the water soluble adhesive paste with respect to a textile of a cellulose based material or a protein based material, transfer of the dye liquid from the above-described release agent coated sheet with the water soluble adhesive paste to the textile has been not possible.

Textile printing employing electrophotographic methods are also well-known. With electrophotographic methods, high-resolution textile printing is possible in an on-demand manner. However, since an appropriate dye toner should be selected according to each textile type, it is desirable to simplify the processes as well as to reduce a number of types in supplies such as ink and toner.

SUMMARY

In view of the foregoing, in an aspect of this disclosure, there is provided a novel textile printing method including printing to a textile with a material including a dye expressed by the following general formula 1.

<General formula 1>

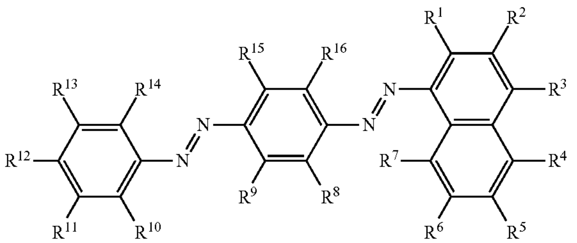

In general formula 1, $R^1$ to $R^{16}$ is H, $CH_3$, OH, $NHC_2H_5$, COOH, $SO_3H$, $SO_3Na$, $NO_2$, or $NH_2$.

These and other aspects, features, and advantages will be more fully apparent from the following detailed description of illustrative embodiments, the accompanying drawings, and associated claims.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
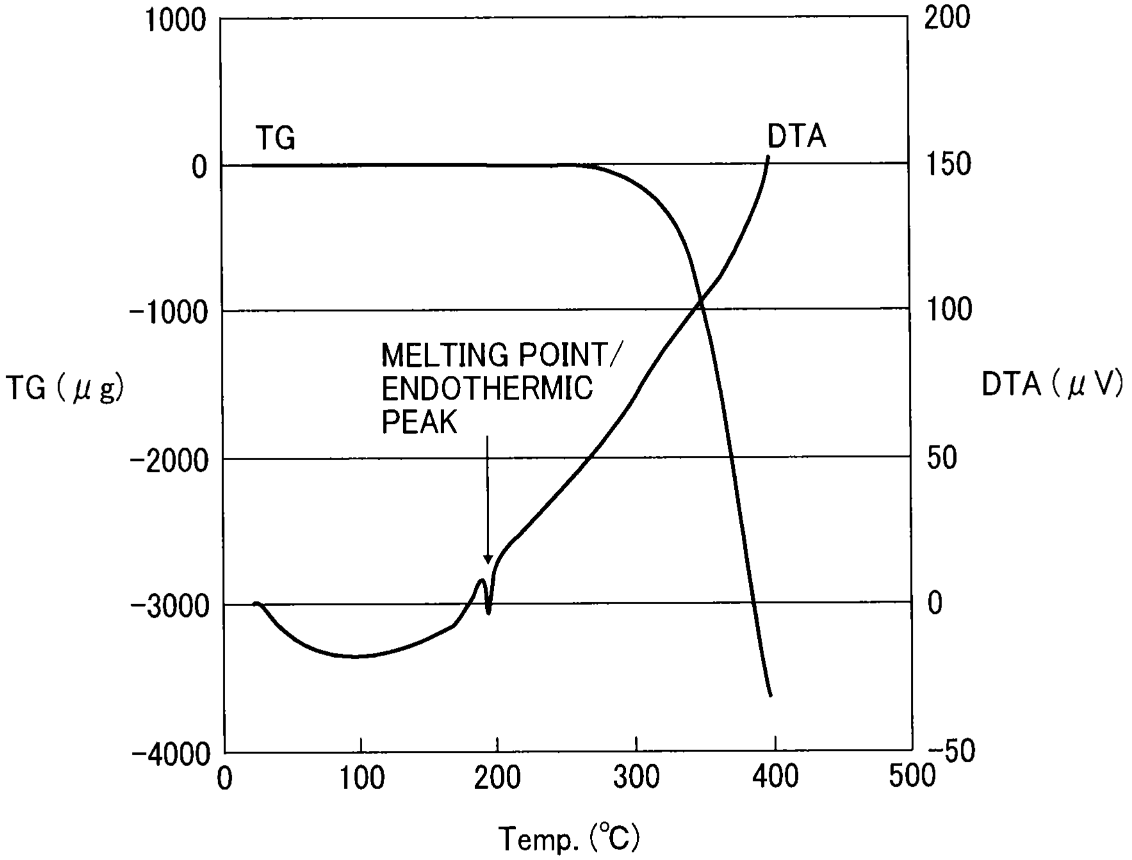
FIG. 1 is a graph showing an example of an analysis of thermogravimetry (hereinafter referred to as TG) and differential thermal analysis (hereinafter referred to as DTA) of a disperse dye of Disperse Violet 31.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

Hereinafter, exemplary embodiments of the present invention are described in detail with reference to the drawings. However, the present invention is not limited to the exemplary embodiments described below, but may be modified and improved within the scope of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

In a later-described comparative example, illustrative embodiment, and alternative example, for the sake of simplicity, the same reference numerals will be given to constituent elements such as parts and materials having the same functions, and redundant descriptions thereof omitted.

There is provided a novel textile printing method that obtains dyeing and adherence of a dye to a textile formed of natural fibers that is difficult to dye with conventional sublimation dyes.

The mainstream of transfer textile printing technology is sublimation textile printing. Sublimation textile printing is a method of vaporizing, into a cluster state or molecular state, a solid dye with heat, and bonding the vaporized solid dye to a textile to dye the textile. With sublimation textile printing, there is no problem when the textile is formed of synthetic fibers such as polyester. However, when the textile is formed of natural fibers such as cotton, silk, and wool, sublimation textile printing is not possible without conducting a specific surface processing to the textile formed of natural fibers. This is due to low compatibility between natural fibers and the vaporized solid dye. It is discovered that employing a specific dye that liquefies by heating and using the specific dye in a liquefied state enables dyeing and adherence of the specific dye to the textile formed of natural fibers, which is difficult to dye with conventional sublimation dyes.

The following is an exemplary embodiment of the textile printing method of the present invention.

[Aspect 1]

A textile printing method including printing to a textile with a material including a dye expressed by general formula 1.

<General formula 1>

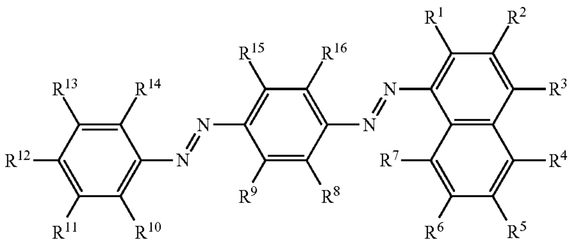

(In general formula 1, $R^1$ to $R^{16}$ is H, $CH_3$, OH, $NHC_2H_5$, COOH, $SO_3H$, $SO_3Na$, $NO_2$, or $NH_2$)

[Aspect 2]

The textile printing method of aspect 1 in which the textile is formed of natural fibers with a principal component of cotton or silk

[Aspect 3]

The textile printing method of aspect 1 in which the dye liquefies by heating.

[Aspect 4]

The textile printing method of aspect 1 in which the material is an inkjet ink for use in digital textile printing.

[Aspect 5]

The textile printing method of aspect 1 in which the material is an electrophotographic toner for use in digital textile printing.

[Aspect 6]

The textile printing method of aspect 1 further including forming an image with the material on an flexible supporting medium or an intermediate transfer body and heat transferring the image on the flexible supporting medium or the intermediate transfer body to the textile.

[Aspect 7]

The textile printing method of aspect 1 further including directly forming an image with the material on the textile.

[Aspect 8]

An inkjet ink including the dye liquefying by heat expressed by general formula 1.

<General formula 1>

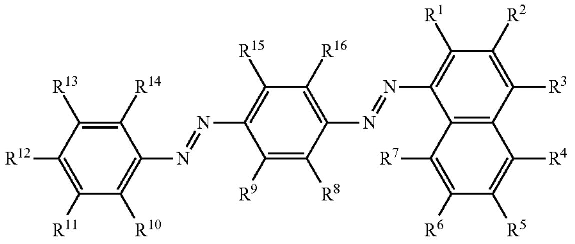

(In general formula 1, $R^1$ to $R^{16}$ is H, $CH_3$, OH, $NHC_2H_5$, COOH, $SO_3H$, $SO_3Na$, $NO_2$, or $NH_2$)

[Aspect 9]

An electrophotographic toner including the dye liquefying by heat expressed by general formula 1.

<General formula 1>

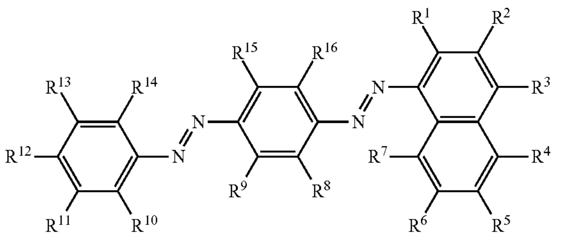

(In general formula 1, $R^1$ to $R^{16}$ is H, $CH_3$, OH, $NHC_2H_5$, COOH, $SO_3H$, $SO_3Na$, $NO_2$, or $NH_2$)

Conventionally, a dye is changed according to fibers to be dyed. For example, a disperse dye is used with respect to polyester-based fibers, a reactive dye or a direct dye is used with respect to cotton-based fibers, and an acid dye is used with respect to silk-based fibers. The above-described reactive dye and acid dye do not exhibit sublimability. Thus, transfer textile printing technology to form an image on natural fibers such as cotton or silk is unavailable, and pursuing individuality or design utilizing texture and elegance distinctive to natural fibers is not possible.

By contrast, in the above-described exemplary embodiment of the textile printing method of the present invention, by employing the material including the dye (hereinafter also referred to as dye X) expressed by general formula 1, dyeing and adherence of the dye to various types of fibers such as polyester, cotton, and silk is enabled. The reason that enables dyeing and adherence of the dye X to various types of fibers is unclear. It is presumed that in a case of polyester-based fibers, Van der Waals force is a main contributor. In a case of cotton and silk, it is presumed that force such as a hydrogen bond is a main contributor. The dye X belongs to the category of the reactive dye. However, the dye X has a linear and a planar structure. There are many sites in the structure of the dye X that are compatible to and adsorptive to textiles of different materials. This structure of the dye X is presumed to be a factor that enables dyeing and adherence of the dye X to various types of textiles.

By employing the dye X having a melting point in a range from a room temperature or more to a transfer temperature or less, it is possible to transfer the image printed on the flexible supporting medium such as paper to the textile including natural fibers such as cotton or silk. The dye X liquefies at heat transfer. By contacting the liquefied dye X on the flexible supporting medium to the textile and applying pressure, transfer of the liquefied dye X to the textile is attained. However, not all of the dye X is liquefied. A portion of the dye X is transferred in a solid state with sublimation.

Whether or not the dye X is liquefied by heating can be easily detected with thermal analysis. For example, FIG. 1 is a graph showing an example of an analysis of thermogravimetry (hereinafter referred to as TG) and differential thermal analysis (hereinafter referred to as DTA) of the disperse dye of Disperse Violet 31. The left vertical axis of FIG. 1 is TG measurement results and the right vertical axis of FIG. 1 is DTA measurement results. According to DTA, an endothermic peak is around 200° C., and is a melting point of Disperse Violet 31. In recent years, by employing a heat-resistance imaging device, a state change of materials such as the above-described Disperse Violet 31 can be visually confirmed. In a case of the above-described example of Disperse Violet 31, by conducting heat transfer around 210° C., transfer of liquefied Disperse Violet 31 to a textile is attained.

Examples of the dye X are shown in the following Table 1.

TABLE 1

| Dye | $R^1$ | $R^2$ | $R^3$ | $R^4$ | $R^5$ | $R^6$ | $R^7$ | $R^8$ | $R^9$ | $R^{10}$ | $R^{11}$ | $R^{12}$ | $R^{13}$ | $R^{14}$ | $R^{15}$ | $R^{16}$ |
|---|---|---|---|---|---|---|---|---|---|---|---|---|---|---|---|---|
| Dye A | OH | H | H | H | H | H | H | H | H | H | H | H | H | H | H | H |
| Dye B | OH | H | H | H | H | H | H | H | H | H | H | H | H | $CH_3$ | H | $CH_3$ |
| Dye C | OH | H | H | H | H | H | H | $CH_3$ | H | H | $CH_3$ | H | H | H | H | H |
| Dye D | OH | H | H | H | H | H | H | H | $CH_3$ | H | H | H | H | $CH_3$ | H | H |
| Dye E | OH | H | H | H | H | H | H | $CH_3$ | H | $CH_3$ | H | H | $CH_3$ | H | $CH_3$ | H |
| Dye F | OH | H | H | H | $SO_3H$ | H | $SO_3H$ | H | H | H | H | H | H | H | H | H |
| Dye G | OH | $SO_3Na$ | H | H | $SO_3Na$ | H | $SO_3Na$ | H | H | H | H | H | H | H | H | H |
| Dye H | H | $NHC_2H_5$ | H | H | H | H | H | H | H | H | H | H | H | H | H | H |
| Dye I | OH | H | H | H | COOH | H | COOH | H | H | H | H | H | H | H | H | H |
| Dye J | OH | H | H | H | H | H | H | $NO_2$ | H | H | H | H | H | H | H | H |
| Dye K | OH | H | H | H | H | H | H | H | H | H | H | H | H | $NH_2$ | H | $NH_2$ |

An example of a synthesis method of the dye X is shown in the following reaction formula.

First, hydrochloric acid is added to aniline and stirred. Sodium nitrite is dripped while cooling to obtain diazotization. Accordingly, benzenediazonium chloride is synthesized. Next, aniline and sodium hydroxide are melted and dripped to obtain a diazo coupling reaction. Accordingly, aminoazobenzene is synthesized. Next, hydrochloric acid is added and stirred. Sodium nitrite is dripped while cooling. After reaction, 2-naphthol and sodium hydroxide are melted and dripped. Accordingly, the dye X is obtained.

By appropriately changing compounds to be reacted, the dye X represented by the above-described general formula 1 is synthesized.

<Reaction formula>

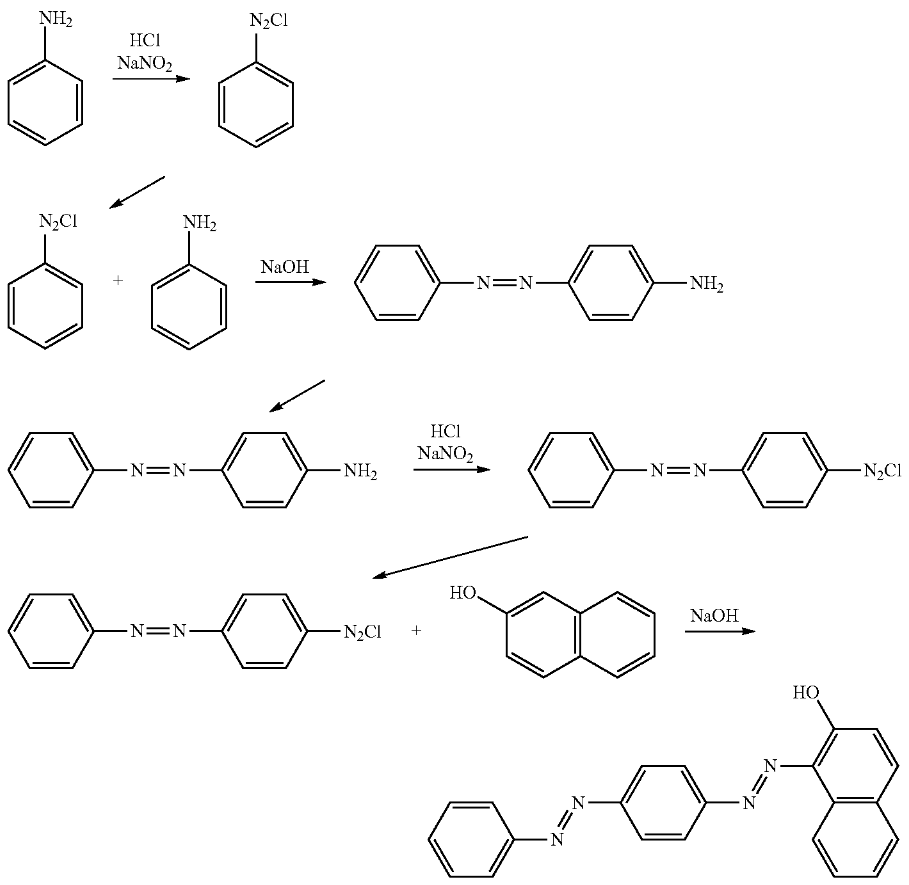

In the exemplary embodiment of the textile printing method of the present invention, other dyes may be used in combination with the dye X. Ratio of other dyes with respect to a whole of dyes is preferably 30% by mass or less.

In a normal powder dye, a purity of the normal powder dye is approximately 50%. There are many cases in which a large amount of sodium chloride or mirabilite is included in the normal power dye. The large amount of sodium chloride or mirabilite exerts a negative influence with respect to chargabilty and resistance of a liquid. Thus, it is preferable to refine the normal powder dye or employ, from the beginning, a normal powder dye including a small amount of salts, preferably, with a purity of 80% or more. If a purity of the dye X is 80% or more, a high quality image is obtained, and is preferable.

The purity of the dye X is obtained with the following melting and reprecipitation method.

(1) The dye X is melted and extracted with a solvent such as N,N-dimethylformamide that melts only the dye X and does not melt inorganic salts such as sodium chloride or mirabilite.

(2) A solution of the melted and extracted dye X is mixed with a solvent such as acetone that does not melt the dye X, and the dye X is separated.

(3) The purity is calculated with the following formula.

(Separated dye mass/Initial dye mass)x100%

In transfer textile printing, the image is first printed on the flexible supporting medium or the intermediate transfer body and then transferred to the textile by heating. Accordingly, dyeing and adherence of the dye X to the textile is obtained. Thus, only the dye X moves to the textile and a soaping process is unnecessary. From the standpoint of an amount of drainage of water and environment friendliness, the exemplary embodiment of the textile printing method of the present invention has large merit. When the textile is formed of natural fibers, printing with conventional sublimation printing technology is not possible without conducting the specific surface processing to the textile formed of natural fibers. The flexible supporting medium is preferably a medium with high heat resistance and low surface energy such as paper or polyimide normally employed in transfer textile printing.

The above-described exemplary embodiment of the textile printing method of the present invention is described with respect to transfer textile printing. However, the exemplary embodiment of the textile printing method of the present invention is also applicable to direct textile printing. In a case of direct textile printing, the image is directly printed on a textile. Then a color development process and the soaping process are conducted.

Figure 3:
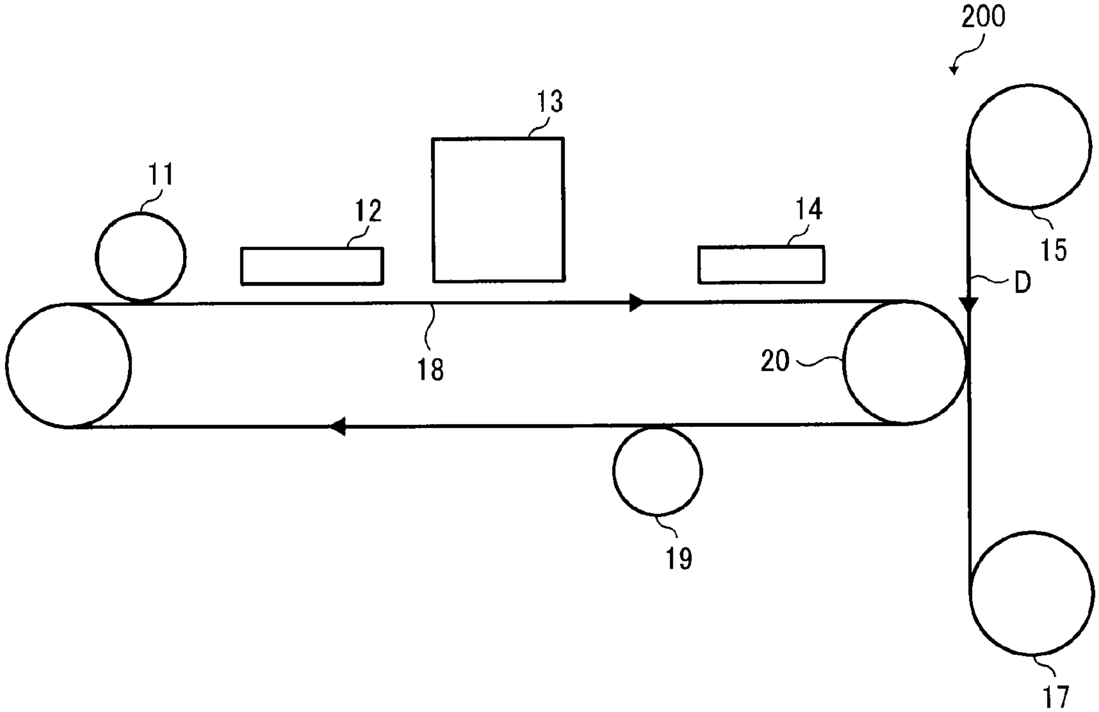
FIG. 3 is a schematic view of another example of the digital textile printing device employing the inkjet method.

When implementing the exemplary embodiment of the textile printing method of the present invention, it is preferable to incorporate the exemplary embodiment of the textile printing method of the present invention in a digital textile printing device that conducts in-line transfer textile printing as shown in FIG. 3. The digital textile printing device that conducts in-line transfer textile printing has good operation efficiency.

Transfer process temperature is preferably in a range from 160° C. to 220° C., and more preferably in a range from 180° C. to 200° C. If the transfer process temperature is lower than 160° C., transfer of a dye liquid is insufficient and concentration of the dye liquid declines. If the transfer process temperature is higher than 220° C., bleeding of the dye liquid becomes worse and properties of the textile may change. Transfer process time is preferably in a range from 30 seconds to 180 seconds, and more preferably in a range from 60 seconds to 120 seconds. If the transfer process time is shorter than 30 seconds, transfer of the dye liquid is insufficient and concentration of the dye liquid declines. If the transfer process time is longer than 180 seconds, bleeding of the dye liquid becomes worse and properties of the textile may change. Dye molecular weight is preferably 600 or less. If the dye molecular weight is too large, there is a tendency to decline in transferability.

Applied pressure at heat transfer is preferably in a range from 50 KPa to 200 KPa. From a standpoint of simplifying a pressure applying mechanism, applied pressure at heat transfer is more preferably in a range from 50 KPa to 100 KPa. By applying pressure in the range from 50 KPa to 200 KPa, high quality transfer textile printing with good dyeing and adherence of the dye X to the textile formed of natural fibers is obtained.

Specific examples of the textile to which the exemplary embodiment of the textile printing method of the present invention may be applied are plant fibers, animal fibers, regenerated fibers, semi-synthetic fibers, and synthetic fibers. Examples of the plant fibers are cotton and hemp. Examples of the animal fibers are silk, wool, alpaca, angora, cashmere, and mohair. Examples of the regenerated fibers are rayon, cupra, and polynosic. Examples of the semi-synthetic fibers are acetate, triacetate, and promix. Examples of the synthetic fibers are nylon, polyester, acrylic, polyvinyl chloride, and polyurethane. Cotton of the plant fibers, polyester of the synthetic fibers, and silk of the animal fibers enable good quality printing and are particularly preferable.

The exemplary embodiment of the textile printing method of the present invention is desirable to digital textile printing. However, the exemplary embodiment of the textile printing method of the present invention may be applied to plate-making textile printing methods such as a screen printing method or a rotary-screen printing method.

Figure 2:
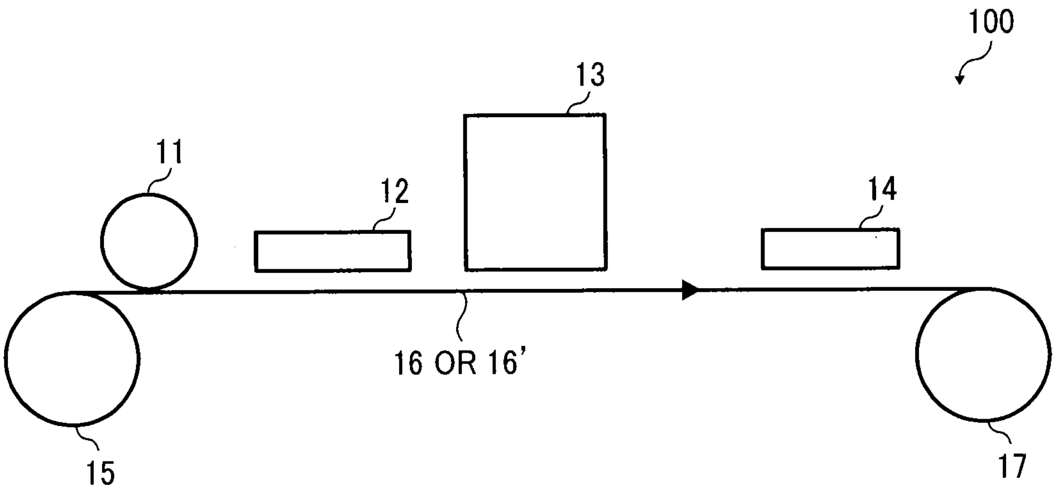
FIG. 2 is a schematic view of an example of a digital textile printing device employing an inkjet method.
Figure 4:
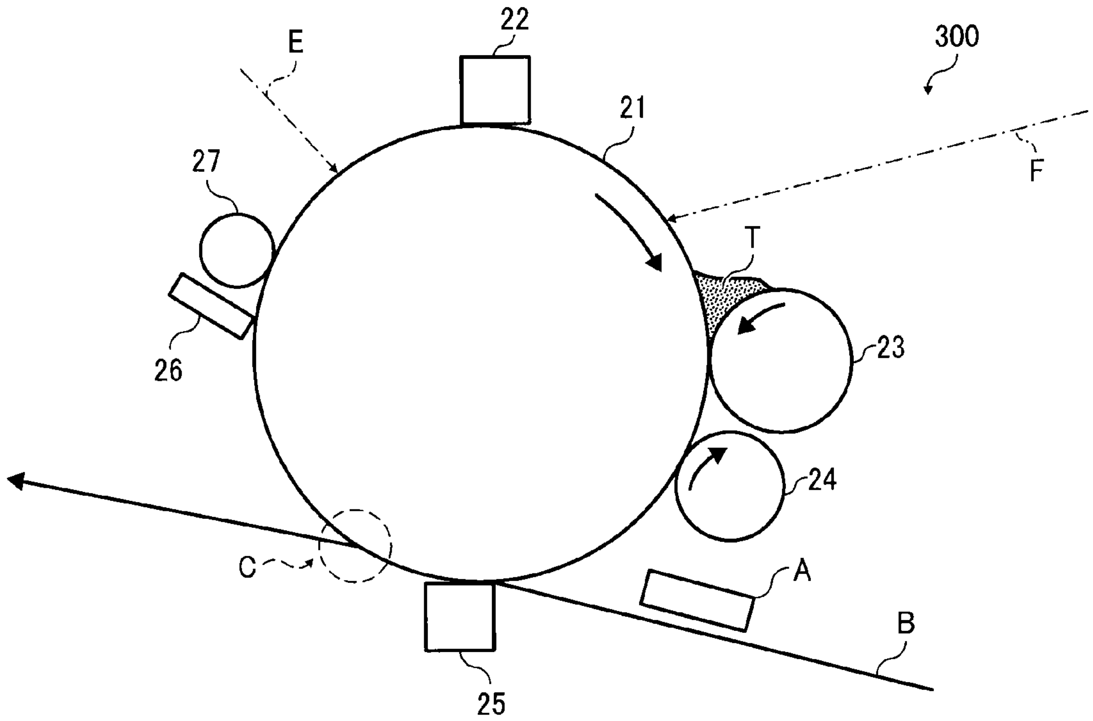
FIG. 4 is a schematic view of an example of the digital textile printing device employing an electrophotographic method.
Figure 5:
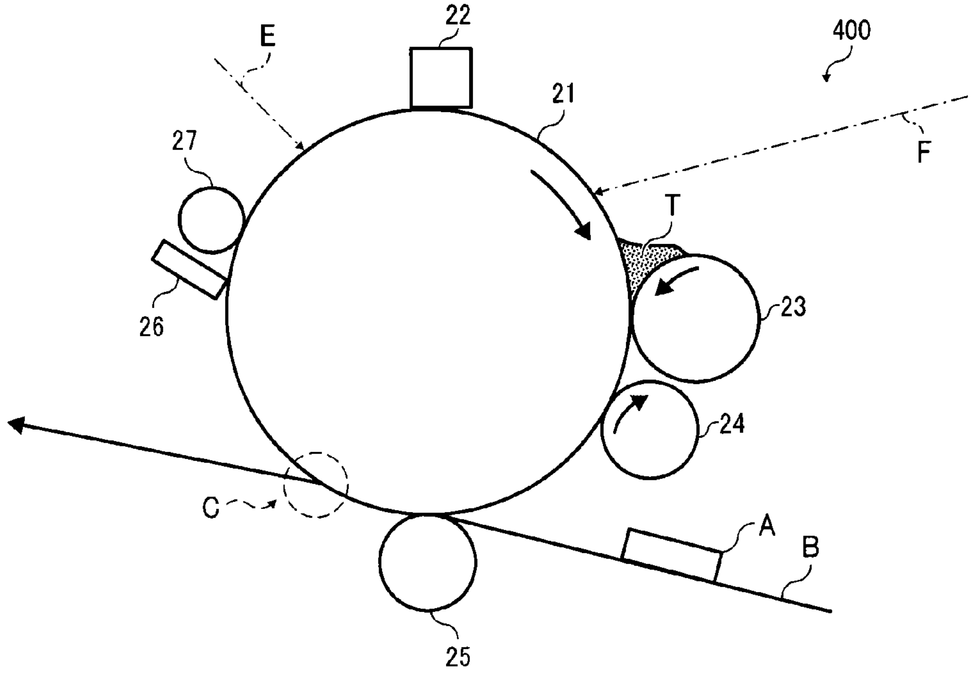
FIG. 5 is a schematic view of another example of the digital textile printing device employing the electrophotographic method.
Figure 6:
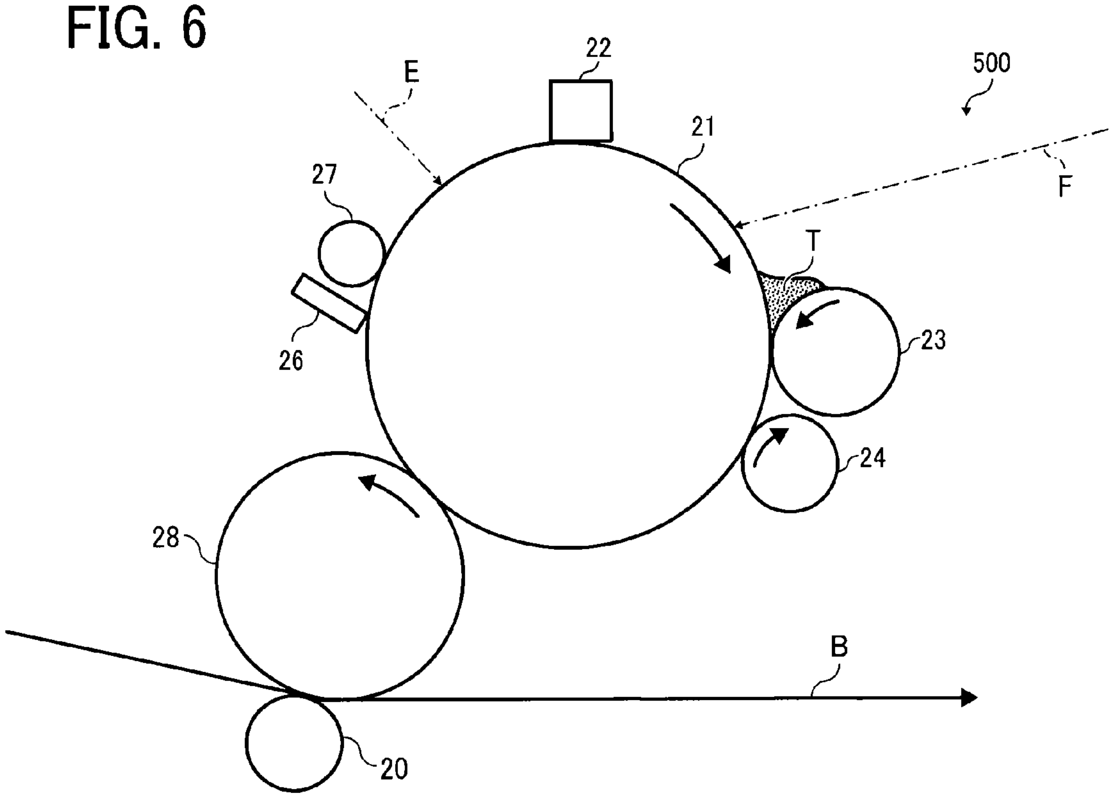
FIG. 6 is a schematic view of a further example of the digital textile printing device of FIG. 5 including an intermediate transfer roller.

Regarding digital textile printing, the mainstream is an inkjet method and an electrophotographic method. The exemplary embodiment of the textile printing method of the present invention may be used in both methods. FIG. 2 is a schematic view of an example of the digital textile printing device employing the inkjet method. FIG. 3 is a schematic view of another example of the digital textile printing device employing the inkjet method. FIG. 4 is a schematic view of an example of the digital textile printing device employing the electrophotographic method. FIG. 5 is a schematic view of another example of the digital textile printing device employing the electrophotographic method. FIG. 6 is a schematic view of a further example of the digital textile printing device employing the electrophotographic method. Details regarding FIG. 4 to FIG. 6 are described later.

The following is a description of an inkjet device 100 serving as the digital textile printing device of FIG. 2. In a case of direct printing to a textile 16, the textile 16 is set to a supply holder 15. In a case of transfer textile printing, a transfer medium 16' serving as the flexible supporting medium such as a transfer sheet is set to the supply holder 15. A pre-processing liquid is coated on the textile 16 or the transfer medium 16' with a pre-processing coating roller 11. The pre-processing liquid is dried with a pre-processing liquid dryer 12. Then ink is discharged from an inkjet head 13 and printing is conducted on the textile 16 or the transfer medium 16'. The ink is dried with an ink dryer 14. Then the printed textile 16 or the printed transfer medium 16' is wound up by a winding holder 17. In the case of transfer textile printing, the printed transfer medium 16' is contacted with a textile and a print of the printed transfer medium 16' is transferred to the textile with heat and pressure.

The following is a description of an inkjet device 200 serving as the digital textile printing device of FIG. 3 conducting in-line transfer textile printing in which a transfer process is incorporated in-line. Printing is conducted on an intermediate transfer belt 18 serving as the intermediate transfer body. Then a print on the intermediate transfer belt 18 is transferred with a heat/pressure roller 20 to a textile D supplied from a supply holder 15. Then the printed textile D is wound up by a winding holder 17. The transfer process is incorporated in-line. Thus, continuous transfer textile printing is enabled. Residual materials on the intermediate transfer belt 18 are removed with a belt cleaner 19.

The Inkjet ink employed in the inkjet method is manufactured as follows. In a case of manufacturing a water-based ink, the dye X is mixed, melted, and dispersed with materials such as water, water soluble organic solvents, surfactants, dispersing agents, fungicides, pH adjusting agents, and antifoaming agents.

Examples of water soluble organic solvents include, methanol, ethanol, isopropanol, glycerin, ethylene glycol, diethylene glycol, triethylene glycol, propylene glycol, dipropylene glycol, tripropylene glycol, propanediol, butanediol, pentanediol, ethylene glycol monomethyl ether, diethylene glycol monomethyl ether, diethylene glycol monoethyl ether, diethylene glycol monobutyl ether, glycerin, 2-pyrrolidone, N-methylpyrrolidone, and acetone. Ethanol, isopropanol, and ethylene glycol monomethyl ether are preferable when enhancing permeability. Glycerin and diethylene glycol are preferable when preventing drying of the inkjet ink in an inkjet head.

Examples of surfactants include anionic surfactants and nonionic surfactants. Specific examples of anionic surfactants include fatty acid salt, alkyl sulfate, alkyl sulfate ester, alkylbenzenesulfonate, alkylnaphthalenesulfonate, dialkylsulfosuccinate, alkyl phosphate, an alkylnaphthalenesulfonic acid formalin condensate, and polyoxyethylene alkyl sulfate ester salt. Specific examples of nonionic surfactants include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene alkylamine, glycerin fatty acid ester, and an oxyethyleneoxypropylene block copolymer.

Examples of dispersing agents include lignosulfonate, alkylbenzenesulfonate, alkylnaphthalenesulfonate, creosote oil sulfonate formalin condensate, a formalin condensate of cresol sulfonate and 2-naphthol-6-sulfonate, cresol sulfonate formalin condensate, phenol sulfonate formalin condensate, β-naphthol sulfonate formalin condensate, a formalin condensate of β-naphthalene sulfonate and β-naphthol sulfonate, and lignosulfonate and a formalin condensate of lignosulfonate.

Addition amount of the surfactants or dispersing agents with respect to the dye X is, on a mass basis, in a range from 0.1 times to 3 times. Preferably, the addition amount of the surfactants or dispersing agents with respect to the dye X is in a range from 0.5 times to 1.5 times. If the addition amount is less than 0.1 times, effect of addition is small. If the addition amount exceeds 3 times, there are cases in which dyeing and adherence of the dye X to a textile is influenced.

Examples of fungicides include sodium benzoate, sodium pentachlorophenol, 2-pyridinethiol-1-sodium oxide, sodium sorbate, sodium dehydroacetate, 1,2-benzisothiazolin-3-one (Proxel CRL, Proxel BDN, Proxel GXL from Avecia Inc.).

With respect to pH adjusting agents, there is no limitation as long as pH may be controlled in a range from 6.0 to 12.0. This is to enhance storage stability of the inkjet ink. Examples of pH adjusting agents include diethanolamine, triethanolamine, sodium hydroxide, potassium hydroxide, ammonium hydroxide, lithium carbonate, sodium carbonate, and potassium carbonate.

Examples of antifoaming agents include high oxidation oil-based compounds, glycerin fatty acid ester-based compounds, fluorine-based compounds, and silicone-based compounds.

The inkjet ink is obtained by appropriately mixing the above-described materials and the dye X, and dispersing with a ball mill, a sand mill, or the like.

A volume average particle diameter of the inkjet ink is in a range from 50 nm to 800 nm. Preferably, the volume average particle diameter of the inkjet ink is in a range from 100 nm to 400 nm. If the volume average particle diameter of the inkjet ink is 50 nm or less, dispersing stability declines. If the volume average particle diameter of the inkjet ink is 800 nm or more, clogging of the inkjet head tend to occur. Viscosity of the inkjet ink is preferably in a range from 2 mPa·s to 18 mPa·s, and more preferably in a range from 4 mPa·s to 10 mPa·s.

In a case of manufacturing an oil-based ink, the manufacturing is the same as the case of manufacturing the water-based ink with the exception of the use of an isoparaffin-based solvent and a silicone-based solvent. Examples of the isoparaffin-based solvent include Isopar C, Isopar E, Isopar G, Isopar H, Isopar L, Isopar M, Isopar V, Solvesso 100, Solvesso 150, Solvesso 200, Exxsol 100/140, Exxsol D30, Exxsol D40, Exxsol D80, Exxsol D110, and Exxsol D130 (from ExxonMobil Corporation) (from ExxonMobil Chemical Corporation). Examples of the silicone-based solvent include KF96 1 to 10000 cst ("Shin-Etsu Silicone" from Shin-Etsu Chemical Co., Ltd.); SH200, SH344 (from Dow Corning Toray Co., Ltd.); and TSF451 (from GE Toshiba Silicones Co., Ltd.).

Viscosity of the inkjet ink is low. Accordingly, bleeding is likely to occur. Therefore, to obtain high quality images, it is also effective to conduct a pre-processing to the textile before printing using a pre-processing agent. Well-known pre-processing agents may be employed. Examples of the pre-processing agent include water-soluble metal salts such as potassium chloride and calcium chloride; polycationic compounds such as a polymer of quaternary ammonium salt; and water-soluble polymers such as carboxymethyl cellulose and polyvinyl alcohol.

Regarding the electrophotographic toner employed in the electrophotographic method, a liquid toner (i.e., liquid developer) or a dry toner (i.e., dry developer) may be favorably employed in printing and textile printing.

A carrier liquid of the liquid toner preferably has high resistance and low dielectric constant. For example, isoparaffin-based hydrocarbons and silicone-based oils are good carrier liquids. Examples of the isoparaffin-based hydrocarbons include Isopar C, Isopar E, Isopar G, Isopar H, Isopar L, Isopar M, Isopar V, Solvesso 100, Solvesso 150, Solvesso 200, Exxsol 100/140, Exxsol D30, Exxsol D40, Exxsol D80, Exxsol D110, and Exxsol D130 (from ExxonMobil Corporation) (from ExxonMobil Chemical Corporation).

Examples of the silicone-based oils include KF96 1 cst to 10000 cst ("Shin-Etsu Silicone" from Shin-Etsu Chemical Co., Ltd.); SH200, SH344 (from Dow Corning Toray Co., Ltd.); and TSF451 (from GE Toshiba Silicones Co., Ltd.).

Preferably, a boiling point of the carrier liquid is in a range from 100° C. to 350° C. If the boiling point is less than 100° C., the carrier liquid may volatilize before transfer. Accordingly, issues such as decrease in effect of transfer enhancement, odor, and safety are generated. If the boiling point exceeds 350° C., volatilization of the carrier liquid is difficult. Accordingly, issues arise with respect to color properties due to not being able to remove the carrier liquid in the color development process. If the boiling point is 350° C. or less, the carrier liquid can be removed at a later process of heating and steaming.

Examples of resins for dispersion with respect to the liquid toner are as follows. A vinyl monomer A expressed by the following general formula α; and a graft copolymer or a copolymer of a monomer of one type or two types or more selected from a vinyl monomer B selected from vinylpyridine, vinylpyrrolidone, ethylene glycol dimethacrylate, styrene, divinylbenzene, vinyltoluene, and a vinyl monomer expressed by the following general formula β.

$$CH_2{=}CR^1COOC_nH_{2n+1} \qquad \text{General formula } \alpha\text{:}$$

(In general formula α, $R^1$ is H or $CH_3$, and n is an integer of 6 to 20)

$$CH_2{=}CR^1COOR^2 \qquad \text{General formula } \beta\text{:}$$

(In general formula β, $R^1$ is H or $CH_3$, and $R^2$ is H or an alkyl group with a carbon number of 1 to 4)

With respect to the liquid toner or the dry toner, if an alkali soluble resin or a water soluble resin is included in a portion of a resin of the liquid toner or the dry toner, the resin of the liquid toner or the dry toner dissolves and desorbs from the textile at the color development and adherence process, washing, and the soaping process. Accordingly, the printed textile obtains good textile texture.

Ratio of the alkali soluble resin or the water soluble resin with respect to a whole of the resin is preferably in a range from 10% by mass to 80% by mass, and more preferably in a range from 40% by mass to 70% by mass. If there is a lot of the alkali soluble resin or the water soluble resin, the chargability of the liquid toner or the dry toner declines. If there is little of the alkali soluble resin or the water soluble resin, texture of the textile declines.

Examples of the alkali soluble resin or the water soluble resin include a water soluble melamine resin, a water soluble rosin-modified resin, a water soluble polyester resin, a water soluble acrylic resin, a water soluable epoxy resin, polyvinyl alcohol, polyvinylpyrrolidone, polyethyleneimine, carboxymethyl cellulose, sodium alginate, collagen, gelatin, starch, and chitosan.

Marketed examples of the alkali soluble resin or the water soluble resin include Poval (polyvinyl alcohol or PVA) and Isobam (isobutylene/maleic acid resin) (from Kuraray Co., Ltd.); Neotall and Haridip (alkyd resin, acrylic resin) (from Harima Chemicals Group, Inc.); Denacol (epoxy resin) (from Nagase ChemteX Corporation); and Jurymer (acrylic resin) (from Nihon Junyaku Co., Ltd.).

With respect to the dry toner, examples of resins for binding other than the alkali soluble resin or the water soluble resin include a styrene-acrylic resin, a polyester resin, and an epoxy resin.

With respect to the liquid toner, examples of resins for binding other than the alkali soluble resin or the water soluble resin include a polyolefin resin, an epoxy resin, and a polyester resin.

An acid value of the alkali soluble resin, the water soluble resin, and the resins for binding is preferably in a range from 0 mg/KOH to 2000 mg/KOH. If the acid value exceeds 2000 mg/KOH, development properties decline.

In a case of textile printing with the dry toner, it is preferable that a volume average particle diameter of the dry toner is in a range from 3 μm to 20 μm. If the volume average particle diameter of the dry toner is less than 3 μm, dust particles are generated. If the volume average particle diameter of the dry toner exceeds 20 μm, color and resolution become worse. Measurement of the volume average particle diameter is conducted with a commonly employed Coulter counter method. More specifically, a toner is dispersed in an electrolytic solution, and voltage is applied from both sides of a partition wall including small holes. Due to displacement of the electrolytic solution proportional to a volume of a particle of the toner traversing the hole, electrical resistance momentarily increases between electrodes on each side of the partition wall and a voltage pulse is generated. From the size and the number of voltage pulses, particle size distribution is determined.

In a case of textile printing with the liquid toner, it is preferable that a ζ potential is in a range from 10 mV to 200 mV. If the ζ potential is lower than 10 mV, toner particles aggregate, background fouling occurs due to decline of electrophoretic property, and concentration of the liquid toner declines. If the ζ potential exceeds 200 mV, adherence amount of the liquid toner to a photoconductor declines and concentration of the liquid toner may decline.

It is preferable that a volume average particle diameter of the liquid toner is in a range from 0.1 μm to 5 μm. If the volume average particle diameter of the liquid toner is less than 0.1 μm, there may be cases in which concentration of the liquid toner is insufficient and cases in which bleeding is likely to be generated. If the volume average particle diameter of the liquid toner exceeds 5 μm, there may be cases in which color or resolution becomes worse.

In a case of transfer to a non-smooth transfer sheet or a non-smooth textile with a transfer roller serving as the intermediate transfer body after developing an image on the photoconductor, by applying a pressure in a range from 0.1 $Kg/cm^2$ to 3 $Kg/cm^2$, transferability is enhanced and the image formed on the non-smooth transfer sheet or the non-smooth textile has high concentration of the liquid toner.

In transfer with the transfer roller serving as the intermediate transfer body, an even higher pressure may be applied and transferability is enhanced. However, an amount of a solvent component of the liquid toner at transfer declines compared to the case of transfer that does not employ the intermediate transfer body. Accordingly, in textile printing, it is preferable to secure the amount of the solvent component of the liquid toner necessary for a secondary transfer by spraying the solvent component such as an aliphatic hydrocarbon or a silicone oil on the intermediate transfer body before the secondary transfer. A good spraying amount of the solvent component is in a range from approximately 0.20 $mg/cm^2$ to 0.70 $mg/cm^2$.

Increasing an adherence amount of a developer on the photoconductor to enhance concentration of the liquid toner or making smaller an amount of the solvent component squeezed by a reverse roller obtains an effect of, due to an increase of the amount of the developer on the photoconductor, an increase of the amount of the solvent component that is dyed with respect to the textile.

In a case of direct transfer to the textile, a transfer voltage is preferably an absolute value in a range from 1000 V to 7000 V. In a case of transfer employing the intermediate transfer body, a primary transfer voltage is preferably in a range from 100 V to 1000 V and a secondary transfer voltage is preferably in a range from 300 V to 7000 V.

The following is a description of an electrophotographic device 300 serving as the digital textile printing device of FIG. 4. A photoconductor 21 is charged by a charging voltage supplier 22. An exposure F cancels charge of a non-image portion of the photoconductor 21. A selenium photoconductor, an organic photoconductor, and an amorphous silicon photoconductor may be used as the photoconductor 21. Preferably, a surface potential of the photoconductor 21 is in a range from 400 V to 1600 V. An electrostatic latent image formed of the remaining charge on the photoconductor 21 is developed with a liquid developer including toner T supplied from a developing roller 23. A reverse roller 24 removes excess of the liquid developer. A textile is conveyed in the direction B and separates from the photoconductor 21 at a textile separation point C. A solvent coater/sprayer A is included in electrophotographic device 300. A transfer voltage supplier 25 supplies a transfer voltage having a charge opposite a charge of the toner T. Accordingly, the toner T is transferred to the textile.

The developing roller 23 rotates in the direction of the photoconductor 21. The reverse roller 24 rotates in the direction opposite to the photoconductor 21. A linear velocity of the developing roller 23 with respect to the photoconductor 21 is in a range from 1.2 times to 6 times. A linear velocity of the reverse roller 24 with respect to the photoconductor 21 is in a range from 1.2 times to 4 times. A gap between the developing roller 23 and the photoconductor 21 is preferably in a range from 50 μm to 250 μm. A gap between the reverse roller 24 and the photoconductor 21 is preferably in a range from 30 μm to 150 μm. Preferably, the transfer voltage is in a range from 500 V to 4000 V.

The toner T remaining on the photoconductor 21 that did not transfer is removed with a cleaning blade 26 and a cleaning roller 27. Then the photoconductor 21 is neutralized E.

It is to be noted that it is also possible to conduct textile printing with a development method in which a charge of an image portion is canceled and a charge of a non-image portion is left.

The following is a description of an electrophotographic device 400 serving as the digital textile printing device of FIG. 5. The electrophotographic device 400 is another example of the electrophotographic device 300 with the transfer voltage supplier 25 changed to a roller method type. The transfer voltage supplier 25 of the electrophotographic device 300 of FIG. 4 is a charger method type. Compared to the charger method type, the roller method type enables application of pressure at transfer. Thus, good transferability is obtained even in a case of transfer to a textile that is rough and has a large uneven surface. Preferably, a transfer pressure is in a range from 0.1 $Kg/cm^2$ to 3 $Kg/cm^2$.

The following is a description of an electrophotographic device 500 serving as the digital textile printing device of FIG. 6. The electrophotographic device 500 of FIG. 6 is a further example of the electrophotographic device 400 of FIG. 5 including an intermediate transfer roller 28 serving as the intermediate transfer body. Compared to the electrophotographic device 400 of FIG. 5, the electrophotographic device 500 of FIG. 6 enables even higher application of pressure at transfer. Thus, good transferability is obtained even in a case of transfer to a textile that is rough and has a large uneven surface. Preferably, a primary transfer pressure is in a range from 0.1 $Kg/cm^2$ to 3 $Kg/cm^2$, and a secondary transfer pressure is in a range from 0.1 $Kg/cm^2$ to 5 $Kg/cm^2$. At the primary transfer in which the toner T is transferred to the intermediate transfer roller 28, a solvent component in the toner T decreases. Accordingly, at the secondary transfer in which the toner T is transferred from the intermediate transfer roller 28 to the textile, there are cases in which an amount of the solvent component necessary for the secondary transfer is insufficient. Thus, adding a process to spray the solvent component to the intermediate transfer roller 28 before the secondary transfer is effective.

The dry toner employed in the electrophotographic method is obtained by, first, mixing components of a colorant, the resin, and a charge controlling agent. Then, after mixing and kneading with a mixing-kneading device such as a Buss Ko-Kneader, the mixed and kneaded above-described components are subjected to coarse pulverization and fine pulverization. Next, coarse particles and fine particles are cut from the pulverized above-described components so that a predetermined particle diameter is obtained. Accordingly, the dry toner is obtained.

The liquid toner employed in the electrophotographic method is obtained by, first, placing components of a colorant, the resin, and the carrier liquid in a dispersing device such as a ball mill, a key mill, a disc mill, and a pin mill. Then, after dispersing, mixing, and kneading, obtained concentrated toner is adjusted. Next, the adjusted concentrated toner is dispersed in the carrier liquid. Accordingly, the liquid toner is obtained.

With respect to the dry toner, a concentration of the colorant, the resin, and the charge controlling agent may be appropriately determined. For example, the colorant may be in a range from 5% by mass to 15% by mass, the resin may be in a range from 80% by mass to 95% by mass, and the charge controlling agent may be in a range from 1% by mass to 10% by mass.

With respect to the liquid toner (i.e., concentrated toner), an example as follows is possible. For example, the colorant may be in a range from 5% by mass to 10% by mass, the resin may be in a range from 5% by mass to 20% by mass, the carrier liquid may be in a range from 70% by mass to 95% by mass, and the charge controlling agent may be in a range from 0.1% by mass to 1% by mass.

In a case of applying the exemplary embodiment of the textile printing method of the present invention to the above-described plate-making textile printing methods, a plate-making textile printing ink is obtained by, first, placing a colorant, a textile printing adhesive paste, a dispersing agent, and water in a dispersing device such as a ball mill and a bead mill. Then, by dispersing, mixing, and kneading, the plate-making textile printing ink is obtained. Examples of the textile printing adhesive paste include carboxymethyl cellulose (CMC), guar gum, tamarind gum, and sodium alginate. Examples of the dispersing agent include a naphthalenesulfonic acid formalin condensate such as Demol (from Kao Corporation).

With respect to the plate-making textile printing ink, a concentration of the colorant, the textile printing adhesive paste, the dispersing agent, and water may be appropriately determined. For example, the colorant may be in a range from 10% by mass to 25% by mass, the textile printing adhesive paste may be in a range from 15% by mass to 40% by mass, the dispersing agent may be in a range from 1% by mass to 5% by mass, and water may be in a range from 60% by mass to 80% by mass.

EXAMPLES

Further understanding can be obtained by reference to specific examples and specific comparative examples, which are provided hereinafter. However, it is to be understood that the embodiments of the present invention are not limited to the following examples.

It is to be noted that textile printing of the following examples and comparative examples are conducted with respect to four types of textiles. The four types of textiles are cotton, polyester, silk, and a mixed textile of cotton and polyester of a 50:50 combination.

It is also to be noted that "parts" and "%" in the following examples and comparative examples are defined as "parts by mass" and "% by mass" unless otherwise specified.

Example 1

The following materials are placed in a sand mill and dispersed for 3 hours. Then, 25 parts of pure water is added and dispersed for 1 hour. Accordingly, ink of example 1 is obtained.

| | |
|---|---|
| Dye A of table 1 (a product with 98% purity) | 5 parts |
| Glycerin | 5 parts |
| Diethylene glycol | 15 parts |
| Dispersing agent: DISPERBYK-198 (from BYK Japan K.K.) | 0.5 parts |
| Surfactant: polyoxyethylene sorbitan fatty acid ester (Rheodol TW-P120, from Kao Corporation) | 0.4 parts |
| Fungicide: San-ai bac AP (from San-ai Oil Co., Ltd.) | 0.5 parts |
| pH adjusting agent: lithium hydroxide | 0.1 parts |
| Pure water | 48.5 parts |

With the ink of example 1, printing is conducted on a 70 W (Size: A4) paper (from Ricoh Company, Ltd.) employing the digital textile printing device of FIG. 2. With respect to each of the four types of textiles, an image printed on the 70 W (Size: A4) paper is superimposed and heat transferred. Heat transfer is conducted with a Daijin presser UN-3338M (from Unique) at conditions of a transfer pressure of 100 KPa, 200° C., for 1 minute.

Example 2

The following materials are placed in a pin mill and dispersed for 10 hours. Then, 23 parts of Isopar H is added and dispersed for 1 hour. Accordingly, a concentrated toner of example 2 is obtained.

| | |
|---|---|
| Dye B of table 1 (a product with 95% purity) | 7 parts |
| Lauryl methacrylate/methyl methacrylate/methacrylic acid (80/10/10) copolymer, Isopar H 20% solution (Resin formed in-house, Ricoh) | 30 parts |
| Rosin-modified phenol resin: Tamanol 135 (from Arakawa Chemical Industries, Ltd.) | 10 parts |
| Isopar H (from ExxonMobil Corporation) | 29 parts |
| Charge controlling agent: zirconium naphthenate | 1 part |

With a developer formed of mixing 100 g of the concentrated toner of example 2 and 1 L of Isopar H, printing is conducted on a 70 W (Size: A4) paper (from Ricoh Company, Ltd.) employing the digital textile printing device of FIG. 4. With respect to each of the four types of textiles, an image printed on the 70 W (Size: A4) paper is superimposed and heat transferred. Heat transfer is conducted with a Daijin presser UN-3338M (from Unique) at conditions of a transfer pressure of 100 KPa, 190° C., for 1 minute.

Example 3

The following materials are mixed and kneaded with a Buss Ko-Kneader, and then cooled. Next, by using a pulverizer, the mixed, kneaded, and cooled materials are subjected to coarse pulverization. Then, by using a jet mill, further subjected to fine pulverization. Then, the pulverized materials are sorted. Accordingly, a dry toner of example 3 is obtained.

| | |
|---|---|
| Dye C of table 1 (a product with 85% purity) | 20 parts |
| Styrene-acrylic resin (styrene/acrylic = 60/40) (SR2411, from Mitsubishi Rayon Co., Ltd.) | 78 parts |
| Charge controlling agent: metal complex of salicylic acid derivative (Bontron E-84, from Orient Chemical Industries Co., Ltd.) | 2 parts |

With the dry toner of example 3, printing is conducted on a polyimide film using a dry method type printer IPSiO SP6210 (from Ricoh Company, Ltd.). With respect to each of the four types of textiles, an image printed on the polyimide film is superimposed and heat transferred. Heat transfer is conducted with a Daijin presser UN-3338M (from Unique) at conditions of a transfer pressure of 100 KPa, 180° C., for 2 minutes.

Example 4

The following materials are placed in a ball mill and dispersed for 24 hours. Then, 22 parts of Isopar H is added and dispersed for 1 hour. Accordingly, a concentrated toner of example 4 is obtained.

| | |
|---|---|
| Dye F of table 1 (a product with 90% purity) | 8 parts |
| Epoxy modified resin, Epikote 802 (from Japan Epoxy Resins Co., Ltd.) | 10 parts |
| stearyl methacrylate/methyl methacrylate/methacrylic acid (80/10/10) copolymer, Isopar H 20% solution (Resin formed in-house, Ricoh) | 20 parts |
| Isopar H (from ExxonMobil Corporation) | 35 parts |
| Charge controlling agent: zirconium octanoate | 5 parts |

With a developer formed of mixing 100 g of the concentrated toner of example 4 and 1 L of Isopar H, direct textile printing to the four types of textiles is conducted using the digital textile printing device of FIG. 5 that employs the electrophotographic method. Next, a treatment of imbuing and adhering the concentrated toner of example 4 to the four types of textiles is conducted with a high temperature (HT) steaming method at 130° C. Then, a treatment is conducted with 2 g/L of an anion-based surfactant (Senkanol, from Senka Corporation) at a condition of 80° C., for 5 minutes.

Example 5

The following materials are placed in a sand mill and dispersed for 3 hours. Then, 25 parts of pure water is added and dispersed for 1 hour. Accordingly, ink of example 5 is obtained.

| | |
|---|---|
| Dye G of table 1 (a product with 98% purity) | 6 parts |
| Glycerin | 6 parts |
| Diethylene glycol | 14 parts |
| Dispersing agent: DISPERBYK-198 (from BYK Japan K.K.) | 0.6 parts |
| Surfactant: polyoxyethylene sorbitan fatty acid ester (Rheodol TW-P120, from Kao Corporation) | 0.3 parts |
| Fungicide: San-ai bac AP (from San-ai Oil Co., Ltd.) | 0.5 parts |
| pH adjusting agent: lithium hydroxide | 0.1 parts |
| Pure water | 47.5 parts |

With the ink of example 5, direct textile printing to the four types of textiles is conducted using the digital textile printing device of FIG. 2 that employs the inkjet method. Next, a treatment of imbuing and adhering the ink of example 5 to the four types of textiles is conducted with a HT steaming method at 170° C. Then, a treatment is conducted with 2 g/L of an anion-based surfactant (Senkanol, from Senka Corporation) at a condition of 80° C., for 5 minutes.

Example 6

The following materials are placed in a sand mill and dispersed for 3 hours. Then, 25 parts of pure water is added and dispersed for 3 hours. Accordingly, ink of example 6 is obtained.

| | |
|---|---|
| Dye D of table 1 (a product with 98% purity) | 5 parts |
| Glycerin | 5 parts |
| Diethylene glycol | 15 parts |
| Dispersing agent: creosote oil sodium sulphonate formalin condensate (Demol, from Kao Corporation) | 0.5 parts |
| Surfactant: polyoxyethylene sorbitan fatty acid ester (Rheodol TW-P120, from Kao Corporation) | 0.4 parts |
| Fungicide: San-ai bac AP (from San-ai Oil Co., Ltd.) | 0.5 parts |
| pH adjusting agent: lithium hydroxide | 0.1 parts |
| Pure water | 48.5 parts |

With the ink of example 6, printing is conducted on a plasma treated polyimide (Kapton (Registered trademark), from Du Pont-Toray Co., Ltd.) employing the digital textile printing device of FIG. 2. With respect to each of the four types of textiles, an image printed on the plasma treated polyimide is superimposed and heat transferred. Heat transfer is conducted with a Daijin presser UN-3338M (from Unique) at conditions of a transfer pressure of 100 KPa, 190° C., for 1 minute.

Example 7

The following materials are placed in a sand mill and dispersed for 3 hours. Then, 20 parts of pure water is added and dispersed for 2 hours. Accordingly, ink of example 7 is obtained.

| | |
|---|---|
| Dye E of table 1 (a product with 93% purity) | 10 parts |
| Glycerin | 5 parts |
| Diethylene glycol | 10 parts |
| N-methyl-2-pyrrolidone | 5 parts |
| Dispersing agent: DISPERBYK-198 (from BYK Japan K.K.) | 0.5 parts |
| Surfactant: polyoxyethylene sorbitan fatty acid ester (Rheodol TW-P120, from Kao Corporation) | 0.4 parts |
| Fungicide: San-ai bac AP (from San-ai Oil Co., Ltd.) | 0.5 parts |
| pH adjusting agent: lithium hydroxide | 0.1 parts |
| Pure water | 48.5 parts |

With the ink of example 7, textile printing is conducted by heat transferring an image to the four types of textiles employing the digital textile printing device of FIG. 3. The intermediate transfer belt 18 is formed of PFA (Neoflon fluororesin film, from Daikin Industries, Ltd.), and temperature of a heating member is 210° C.

Example 8

The following materials are placed in a sand mill and dispersed for 8 hours. Then, 23 parts of Exxsol D30 (from ExxonMobil Corporation) is added and dispersed for 1 hour. Accordingly, a concentrated toner of example 8 is obtained.

| | |
|---|---|
| Dye H of table 1 (a product with 65% purity) | 12 parts |
| Lauryl methacrylate/methyl methacrylate/methacrylic acid (80/10/10) copolymer, Isopar H 20% solution (Resin formed in-house, Ricoh) | 30 parts |
| polyethylene resin (Sanwax 171P, from Sanyo Chemical Industries, Ltd.) | 3 parts |
| Isopar H (from ExxonMobil Corporation) | 30 parts |
| Charge controlling agent: zirconium naphthenate | 2 parts |

With a developer formed of mixing 100 g of the concentrated toner of example 8 and 1 L of Isopar H, textile printing is conducted by heat transferring an image to the four types of textiles employing the digital textile printing device of FIG. 6. The intermediate transfer roller 28 is formed of PFA (Neoflon fluororesin film, from Daikin Industries, Ltd.), and temperature of a heating member is 200° C.

Example 9

The following materials are placed in a sand mill and dispersed for 3 hours. Then, 23 parts of pure water is added and dispersed for 3 hours. Accordingly, ink of example 9 is obtained.

| | |
|---|---|
| Dye I of table 1 (a product with 98% purity) | 3 parts |
| Dye J of table 1 (a product with 98% purity) | 2 parts |
| Dye K of table 1 (a product with 98% purity) | 2 parts |
| Glycerin | 5 parts |
| Diethylene glycol | 15 parts |
| Dispersing agent: creosote oil sodium sulphonate formalin condensate (Demol, from Kao Corporation) | 0.5 parts |
| Surfactant: polyoxyethylene sorbitan fatty acid ester (Rheodol TW-P120, from Kao Corporation) | 0.4 parts |
| Fungicide: San-ai bac AP (from San-ai Oil Co., Ltd.) | 0.5 parts |
| pH adjusting agent: lithium hydroxide | 0.1 parts |
| Pure water | 48.5 parts |

With the ink of example 9, direct textile printing to the four types of textiles is conducted using the digital textile printing device of FIG. 2 that employs the inkjet method. Next, a treatment of imbuing and adhering the ink of example 9 to the four types of textiles is conducted with a HT steaming method at 170° C. Then, a treatment is conducted with 2 g/L of an anion-based surfactant (Senkanol, from Senka Corporation) at a condition of 80° C., for 5 minutes.

Example 10

Ink of example 10 is the same as the ink of example 5. With the ink of example 10, printing is conducted on a Raicho Dull Art N (Size: A3) paper (from Chuetsu Pulp & Paper Co., Ltd.) employing the digital textile printing device of FIG. 2. With respect to each of the four types of textiles, an image printed on the Raicho Dull Art N (Size: A3) paper is superimposed and heat transferred. Heat transfer is conducted with a Daijin presser UN-3338M (from Unique) at conditions of a transfer pressure of 100 KPa, 200° C., for 1 minute. Next, a treatment of imbuing and adhering the ink of example 10 to the four types of textiles is conducted with a HT steaming method at 170° C. Then, a treatment is conducted with 2 g/L of an anion-based surfactant (Senkanol, from Senka Corporation) at a condition of 80° C., for 5 minutes.

Example 11

Ink of example 11 is the same as the ink of example 1. With the ink of example 11, printing is conducted on a polyimide film (Kapton (Registered trademark), from Du Pont-Toray Co., Ltd.) employing the digital textile printing device of FIG. 2. With respect to each of the four types of textiles, an image printed on the polyimide film is superimposed and heat transferred. Heat transfer is conducted with a Daijin presser UN-3338M (from Unique) at conditions of a transfer pressure of 100 KPa, 190° C., for 1 minute.

Example 12

Ink of example 12 is the same as the ink of example 1. With the ink of example 12, printing is conducted on a Raicho Dull Art N (Size: A3) paper (from Chuetsu Pulp & Paper Co., Ltd.) employing the digital textile printing device of FIG. 3. With respect to each of the four types of textiles, an image printed on the Raicho Dull Art N (Size: A3) paper is superimposed and heat transferred. Heat transfer is conducted with a Daijin presser UN-3338M (from Unique) at conditions of a transfer pressure of 50 KPa, 200° C., for 1 minute.

Example 13

Ink of example 13 is the same as the ink of example 10. With the ink of example 13, printing is conducted on a Raicho Dull Art N (Size: A3) paper (from Chuetsu Pulp & Paper Co., Ltd.) employing the digital textile printing device of FIG. 3. With respect to each of the four types of textiles, an image printed on the Raicho Dull Art N (Size: A3) paper is superimposed and heat transferred. Heat transfer is conducted with a Daijin presser UN-3338M (from Unique) at conditions of a transfer pressure of 50 KPa, 200° C., for 1 minute.

Example 14

The following materials are placed in a ball mill and dispersed for 12 hours. Accordingly, ink of example 14 is obtained.

| | |
|---|---|
| Dye K of table 1 (a product with 50% purity) | 20 parts |
| Sodium alginate 20% solution | 30 parts |
| Dispersing agent: creosote oil sodium sulphonate formalin condensate (Demol, from Kao Corporation) | 5 parts |
| Water | 45 parts |

With the ink of example 14, textile printing with respect to the four types of textiles is conducted with a device employing the screen printing method. Next, a treatment of imbuing and adhering the ink of example 14 to the four types of textiles is conducted with a HT steaming method at 170° C. Then, a treatment is conducted with 2 g/L of an anion-based surfactant (Senkanol, from Senka Corporation) at a condition of 80° C., for 5 minutes.

Comparative Example 1

Textile printing is conducted as in Example 1 except for replacing Dye A with Disperse Blue 60.

Comparative Example 2

Textile printing is conducted as in Example 2 except for replacing Dye B with Disperse Yellow 54.

Comparative Example 3

Textile printing is conducted as in Example 4 except for the following. The Dye F is replaced with Reactive Black 1. With respect to the four types of textiles, after printing, sodium silicate (45 to 48 degrees Baume) is coated and left for 20 hours. Next, with respect to the printed and coated four types of textiles, washing is conducted. Then, a treatment is conducted with 2 g/L of an anion-based surfactant (Senkanol, from Senka Corporation) at a condition of 80° C., for 5 minutes.

Comparative Example 4

Textile printing is conducted as in Example 5 except for the following. The Dye G is replaced with Acid Blue 80. With respect to the four types of textiles, after printing, 1% of acetic acid is coated. Then, the printed and coated four types of textiles are subjected to 70° C. for 1 hour. Then, a treatment is conducted with 2 g/L of an anion-based surfactant (Senkanol, from Senka Corporation) at a condition of 80° C., for 5 minutes.

Comparative Example 5

Textile printing is conducted as in Example 1 except for replacing Dye A with Acid Blue 40. It is to be noted that Acid Blue 40, in differential thermal analysis, does not have an endothermic peak and does not liquefy.

Comparative Example 6

Textile printing is conducted as in Example 1 except for replacing Dye A with Solvent Black 3. It is to be noted that Solvent Black 3, in differential thermal analysis, does not have an endothermic peak and does not liquefy.

Comparative Example 7

Ink of comparative example 7 is the same as the ink of example 1. With the ink of comparative example 7, printing is conducted on a 70 W (Size: A4) paper (from Ricoh Company, Ltd.) employing the digital textile printing device of FIG. 2. With respect to each of the four types of textiles, an image printed on the 70 W (Size: A4) paper is superimposed and heat transferred. Heat transfer is conducted with a Daijin presser UN-3338M (from Unique) at conditions of a transfer pressure of 40 KPa, 200° C., for 5 minutes.

Comparative Example 8

Ink of comparative example 8 is the same as the ink of example 1. With the ink of comparative example 8, printing is conducted on a 70 W (Size: A4) paper (from Ricoh Company, Ltd.) employing the digital textile printing device of FIG. 2. With respect to each of the four types of textiles, an image printed on the 70 W (Size: A4) paper is superimposed and heat transferred. Heat transfer is conducted with a Daijin presser UN-3338M (from Unique) at conditions of a transfer pressure of 200 KPa, 140° C., for 5 minutes.

Comparative Example 9

Textile printing is conducted as in Example 1 except for replacing Dye A with Disperse Yellow 23.

The above-described four types of textiles with respect to the above-described examples and comparative examples are tested for color loss. More specifically, imbuing-adherence of formed materials (i.e., the ink, the concentrated toner, and the dry toner of the above-described examples and comparative examples) are tested. A washing fastness test in accord with JIS L 0844 is employed for the test of color loss.

A textile print concentration with respect to the above-described examples and comparative examples is measured with an X-Rite densitometer (from X-Rite Inc.) before and after application of the washing fastness test. Imbuing-adherence of the formed materials are calculated with the following formula. Evaluation with the following standards is conducted. The textile print concentration after application of the washing fastness test and evaluation results of imbuing-adherence of the formed materials are shown together in Table 2. It is to be noted that "–" in columns indicating imbuing-adherence of the formed material of comparative example 5 is defined as undeterminable due to being less than 1%.

Imbuing-adherence of the formed material=(Concentration after washing fastness test/Concentration before washing fastness test)×100%

[Evaluation Standard]
Good: 99% or more
Fair: 90% or more, less than 99%
Poor: less than 90%

TABLE 2

| | Textile print concentration | | | | Imbuing-adherence of the formed material | | | |
|---|---|---|---|---|---|---|---|---|
| | Textile 1 | Textile 2 | Textile 3 | Textile 4 | Textile 1 | Textile 2 | Textile 3 | Textile 4 |
| Example 1 | 1.35 | 1.30 | 1.32 | 1.33 | Good | Good | Good | Good |
| Example 2 | 1.37 | 1.30 | 1.36 | 1.32 | Good | Good | Good | Good |
| Example 3 | 1.30 | 1.28 | 1.27 | 1.26 | Good | Good | Good | Good |
| Example 4 | 1.49 | 1.45 | 1.43 | 1.44 | Good | Good | Good | Good |
| Example 5 | 1.46 | 1.41 | 1.45 | 1.42 | Good | Good | Good | Good |
| Example 6 | 1.42 | 1.40 | 1.44 | 1.41 | Good | Good | Good | Good |
| Example 7 | 1.44 | 1.40 | 1.40 | 1.41 | Good | Good | Good | Good |
| Example 8 | 1.46 | 1.44 | 1.43 | 1.42 | Good | Good | Good | Good |
| Example 9 | 1.40 | 1.40 | 1.43 | 1.41 | Good | Good | Good | Good |
| Example 10 | 1.35 | 1.39 | 1.33 | 1.32 | Good | Good | Good | Good |

TABLE 2-continued

| | Textile print concentration | | | | Imbuing-adherence of the formed material | | | |
|---|---|---|---|---|---|---|---|---|
| | Textile 1 | Textile 2 | Textile 3 | Textile 4 | Textile 1 | Textile 2 | Textile 3 | Textile 4 |
| Example 11 | 1.32 | 1.29 | 1.26 | 1.29 | Good | Good | Good | Good |
| Example 12 | 1.29 | 1.34 | 1.27 | 1.30 | Good | Good | Good | Good |
| Example 13 | 1.38 | 1.44 | 1.37 | 1.41 | Good | Good | Good | Good |
| Example 14 | 1.31 | 1.28 | 1.27 | 1.29 | Good | Good | Good | Good |
| Comparative Example 1 | 0.26 | 1.28 | 0.22 | 0.62 | Poor | Good | Poor | Fair |
| Comparative Example 2 | 0.29 | 1.21 | 0.28 | 0.55 | Poor | Good | Poor | Fair |
| Comparative Example 3 | 1.32 | 0.15 | 0.23 | 0.41 | Good | Poor | Poor | Fair |
| Comparative Example 4 | 0.26 | 0.13 | 1.30 | 0.25 | Poor | Poor | Good | Poor |
| Comparative Example 5 | <0.01 | 0.01 | <0.01 | <0.01 | — | — | — | — |
| Comparative Example 6 | 0.17 | 0.29 | 0.20 | 0.24 | Poor | Good | Poor | Fair |
| Comparative Example 7 | 0.15 | 0.66 | 0.09 | 0.22 | Poor | Fair | Poor | Poor |
| Comparative Example 8 | 0.12 | 0.37 | 0.19 | 0.28 | Poor | Good | Poor | Good |
| Comparative Example 9 | 0.33 | 1.35 | 0.35 | 0.69 | Poor | Good | Poor | Fair |

In table 2, textile 1, textile 2, textile 3, and textile 4 correspond to cotton, polyester, silk, and a mixed textile of cotton and polyester of a 50:50 combination, respectively.

As can be understood from the results of table 2, with the above-described exemplary embodiments of the textile printing method of the present invention, textile printing is possible with respect to plant fibers, synthetic fibers, and animal fibers.

By contrast, the comparative examples indicate good imbuing-adherence of the formed materials, of the comparative examples, only to specific fibers. That is, the comparative examples cannot handle all of the tested plant fibers, synthetic fibers, and animal fibers.

In view of the foregoing, the exemplary embodiment of the textile printing method of the present invention may be applied to the textile formed of synthetic fibers and the textile formed of a mix of natural fibers and synthetic fibers. With the exemplary embodiment of the textile printing method of the present invention, changing the ink or the toner with respect to the type of textile may be omitted, supplies may be reduced, and dyeing is simple. In addition, drainage amount of water in the washing process is small and is environment friendly.

What is claimed is:

1. A textile printing method, comprising:

printing to a textile with a material including a dye expressed by the following general formula (1):

(1)

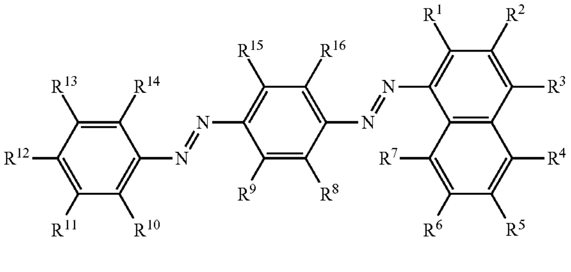

wherein:

$R^1$ to $R^{15}$ are each independently H, OH, $NHC_2H_5$, COOH, $SO_3H$, $SO_3Na$, $NO_2$, or $NH_2$; and $R^{16}$ is OH, $NHC_2H_5$, COOH, $SO_3H$, $SO_3Na$, or $NH_2$.

2. The textile printing method of claim 1, wherein the textile is formed of natural fibers with a principal component of cotton or silk.

3. The textile printing method of claim 1, wherein the dye liquefies by heating.

4. The textile printing method of claim 1, wherein the material is an inkjet ink for use in digital textile printing.

5. The textile printing method of claim 1, wherein the material is an electrophotographic toner for use in digital textile printing.

6. The textile printing method of claim 1, further comprising:

forming an image with the material on a flexible supporting medium or an intermediate transfer body and heat transferring the image on the flexible supporting medium or the intermediate transfer body to the textile.

7. The textile printing method of claim 1, further comprising:

directly forming an image with the material on the textile.

8. An inkjet ink, comprising:

a dye liquefying by heat expressed by formula (1):

(1)

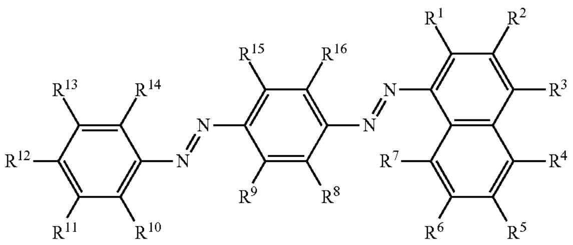

wherein:

$R^1$ to $R^{15}$ are each independently H, OH, $NHC_2H_5$, COOH, $NO_2$, or $NH_2$, and $R^{16}$ is OH, $NHC_2H_5$, COOH, NO, or $NH_2$, and wherein the dye, when liquefying by heat, is configured for sublimation textile printing on polyester fibers or natural fibers with a principal component of cotton or silk.

9. An electrophotographic toner, comprising:

a dye liquefying by heat expressed by formula (1):

(1)

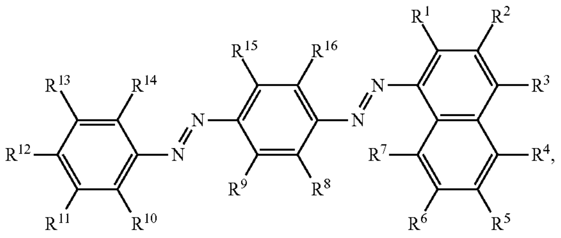

wherein:

$R^1$, $R^{14}$, and $R^{16}$ are each independently H, $CH_3$, OH, $NHC_2H_5$, COOH, $SO_3H$, $SO_3Na$, $NO_2$, or $NH_2$; and $R^2$ to $R^{13}$ and $R^{15}$ are each independently $CH_3$, OH, $NHC_2H_5$, COOH, $SO_3H$, $SO_3Na$, $NO_2$, or $NH_2$.

* * * * *